US009369911B2

(12) United States Patent
Terry

(10) Patent No.: US 9,369,911 B2
(45) Date of Patent: *Jun. 14, 2016

(54) METHOD AND APPARATUS FOR ENHANCED UPLINK MULTIPLEXING

(71) Applicant: Intel Corporation, Santa Clara, CA (US)

(72) Inventor: Stephen E. Terry, Northport, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/542,504

(22) Filed: Nov. 14, 2014

(65) Prior Publication Data

US 2015/0071065 A1   Mar. 12, 2015

Related U.S. Application Data

(63) Continuation of application No. 14/032,114, filed on Sep. 19, 2013, now Pat. No. 8,923,173, which is a continuation of application No. 13/021,884, filed on Feb. 7, 2011, now Pat. No. 8,619,645, which is a continuation of application No. 11/113,763, filed on Apr. 25, 2005, now Pat. No. 7,885,245.

(60) Provisional application No. 60/588,960, filed on Jul. 19, 2004.

(51) Int. Cl.
*H04B 7/216* (2006.01)
*H04W 28/02* (2009.01)
*H04W 28/24* (2009.01)
*H04W 74/08* (2009.01)

(52) U.S. Cl.
CPC ...... *H04W 28/0221* (2013.01); *H04W 28/0268* (2013.01); *H04W 28/24* (2013.01); *H04W 74/0875* (2013.01)

(58) Field of Classification Search
CPC .......................... H04W 28/0268; H04W 28/24
USPC ......... 370/310, 328–330, 340, 431, 462, 464, 370/465
See application file for complete search history.

(56) References Cited

U.S. PATENT DOCUMENTS 6,363,058 B1 * 3/2002 Roobol et al. ................ 370/310
7,058,032 B2   6/2006 Iacono et al.
(Continued)

FOREIGN PATENT DOCUMENTS

EP   0 993 148   4/2000
EP   0993148   4/2000
(Continued)

OTHER PUBLICATIONS

Communication Pursuant to Article 94(3) EPC dated Nov. 3, 2014, in European Patent Application No. 10 179 333.9-1857, 4 pages.
(Continued)

*Primary Examiner* — Dmitry H Levitan
(74) *Attorney, Agent, or Firm* — Blakely, Sokoloff, Taylor & Zafman LLP

(57) ABSTRACT

A method and apparatus for multiplexing are disclosed. Data is received over a plurality of logical channels. Data from the plurality of logical channels is multiplexed into a medium access control (MAC) protocol data unit (PDU) based on a priority associated with each of the plurality of the logical channels. The MAC PDU is transmitted over an uplink transport channel.

16 Claims, 3 Drawing Sheets

(56) References Cited

U.S. PATENT DOCUMENTS

| | | | |
|---|---|---|---|
| 7,295,529 | B2 | 11/2007 | Hwang et al. |
| 7,415,046 | B2 | 8/2008 | Beckmann et al. |
| 7,515,616 | B2 | 4/2009 | Yi et al. |
| 7,522,526 | B2 * | 4/2009 | Yi et al. .................. 370/236 |
| 7,593,407 | B2 * | 9/2009 | Chun et al. ................ 370/394 |
| 7,885,245 | B2 | 2/2011 | Terry |
| 8,619,645 | B2 | 12/2013 | Terry |
| 2003/0007517 | A1 | 1/2003 | Beckmann et al. |
| 2003/0036403 | A1 | 2/2003 | Shiu et al. |
| 2003/0053344 | A1 | 3/2003 | Herrmann |
| 2003/0112786 | A1 | 6/2003 | Terry et al. |
| 2003/0147371 | A1 | 8/2003 | Choi et al. |
| 2004/0042460 | A1 | 3/2004 | Gruhl et al. |
| 2004/0156330 | A1 | 8/2004 | Yi et al. |
| 2004/0228313 | A1 | 11/2004 | Cheng et al. |
| 2004/0228315 | A1 | 11/2004 | Malkamaki |
| 2005/0053035 | A1 | 3/2005 | Kwak et al. |
| 2005/0073985 | A1 | 4/2005 | Heo et al. |
| 2005/0180371 | A1 | 8/2005 | Malkamaki |
| 2007/0079207 | A1 | 4/2007 | Seidel et al. |
| 2008/0220802 | A1 | 9/2008 | Yamanaka et al. |

FOREIGN PATENT DOCUMENTS

| | | |
|---|---|---|
| EP | 0993148 | 12/2000 |
| TW | 200404435 | 3/2004 |
| TW | 200409553 | 6/2004 |
| TW | 200412807 | 7/2004 |
| WO | 2004/059869 | 7/2004 |
| WO | 2005/048491 | 5/2005 |
| WO | 2005/048492 | 5/2005 |

OTHER PUBLICATIONS

Ericsson: "E-DCH multiplexing proposal", 3GPP Draft; R2-041313, 3rd Generation Partnership Project (3GPP), Mobile Competence Centre, 650, Route Des Lucioles, F-06921 Sophia-Antipolis Cedex, France, vol. RAN WG2, No. Cannes, France, Jun. 21-24, 2004, 4 pages.
Hearing Notice dated Nov. 5, 2014, in Indian Patent Application No. 160/DELNP/2007, 1 page.
Nokia et al: "HSDPA Mux Option parameters," 3GPP Draft; R3-020481 (HSDPA IUB MUX Parameters), 3GPP, Mobile Competence Ctr, 650, Rte Des Lucioles, F-06921 Sophia-Antipolis Cedex, FR, vol. RAN WG3, No. Orlando, US, Feb. 18-22, 2002, 15 pages.
Examiner's Report dated Jul. 17, 2014, in Canadian Patent Application No. 2,855,844, 2 pages.
Office Action dated Aug. 2014 (+English translation), in Taiwan Patent Application No. 101129436, 13 pages.
Second Office Action dated Aug. 11, 2014 (+English translation), in Chinese Patent Application No. 201110371173.0, 10 pages.
Second Office Action dated Jul. 22, 2014 (+English translation), in Chinese Patent Application No. 201110371196.1, 14 pages.
Office Action and Search Report for Taiwan Patent Application No. 100126090, mailed Feb. 13, 2014, 12 pages.
Office Action for EP Patent Application No, 10 179 333.9, mailed Jan. 3, 2014, 3 pages.
First Office Action for Chinese Application No. 201110371173.0, mailed Nov. 25, 2013, 7 pages.
Dimou et al., "MAC Scheduling for Uplink Transmission in UMTS WCDMA," Ecole Nationale Supérieure des Télécommunications, IEEE, 2001, pp. 2625-2629.
Office Action for U.S. Appl. No. 13/021,884 dated Dec. 7, 2012, whole document.
Final Office Action for U.S. Appl. No. 13/021,884 dated Feb. 21, 2013, whole document.
Office Action for U.S. Appl. No. 13/021,884 dated Mar. 22, 2013, whole document.
Notice of Allowance for U.S. Appl. No. 13/021,884 dated Aug. 21, 2013, whole document.

Third Office Action dated Feb. 2, 2015 (+English translation), in Chinese Patent Application No. 201110371196.1, 17 pages.
3GPP, "3$^{rd}$ Generation Partnership Project; Technical Specification Group Radio Access Network; Radio Resource Control (RRC) Protocol Specification (Release 1999)," 3GPP TS 25.331 V3.19.0. (Jun. 2004).
3GPP, "3$^{rd}$ Generation Partnership Project; Technical Specification Group Radio Access Network; Radio Resource Control (RRC) Protocol Specification (Release 1999)," 3GPP TS 25.331 V3.210, (Dec. 2004).
3GPP, "3$^{rd}$ Generation Partnership Project; Technical Specification Group Radio Access Network; Radio Resource Control (RRC) Protocol Specification (Release 4)," 3GPP TS 25.331 V4.14.0, (Jun. 2004).
3GPP, "3$^{rd}$ Generation Partnership Project; Technical Specification Group Radio Access Network; Radio Resource Control (RRC) Protocol Specification (Release 4)," 3GPP TS 25.331 V4.17.0, (Mar. 2005).
3GPP, "3$^{rd}$ Generation Partnership Project; Technical Specification Group Radio Access Network; Radio Resource Control (RRC) Protocol Specificaton (Release 5)," 3GPP TS 25.331 V5.9.0, (Jul. 2004).
3GPP, "3$^{rd}$ Generation Partnership Project; Technical Specification Group Radio Access Network; Radio Resource Control (RRC) Protocol Specification (Release 5)," 3GPP TS 25.331 V5.12.1, (Mar. 2005).
3GPP, "3$^{rd}$ Generation Partnership Project; Technical Specification Group Radio Access Network; Radio Resource Control (RRC) Protocol Specification (Release 6)," 3GPP TS 25.331 V6.2.0, (Jul. 2004).
3GPP, "3$^{rd}$ Generation Partnership Project; Technical Specification Group Radio Access Network; Radio Resource Control (RRC) Protocol Specification (Release 6)," 3GPP TS 25.331 V6.5.0, (Mar. 2005).
3GPP, "3$^{rd}$ Generation Partnership Project; Technical Specification Group Radio Access Network; FDD Enhanced Uplink; Overall Description; Stage 2 (Release 6)," 3GPP TS 25.309 V0.2.0, (Jun. 2004).
3GPP, "3$^{rd}$ Generation Partnership Project; Technical Specification Group Radio Access Network; FDD Enhanced Uplink; Overall Description; Stage 2 (Release 6)," 3GPP TS 25.309 V6.2.0, (Mar. 2005).
3GPP, "3$^{rd}$ Generation Partnership Project; Technical Specification Group Radio Access Network; Medium Access Control (MAC) Protocol Specification (Release 1999)," 3GPP TS 25.321 V3.17.0, (Jun. 2004).
3GPP, "3$^{rd}$ Generation Partnership Project; Technical Specification Group Radio Access Network; Medium Access Control (MAC) Protocol Specification (Release 4)," 3GPP TS 25.321 V4.10.0, (Jun. 2004).
3GPP, "3$^{rd}$ Generation Patnership Project; Technical Specification Group Radio Access Network; Medium Access Control (MAC) Protocol Specification (Release 5)," 3GPP TS 25.321 V5.9.0, (Jun. 2004).
3GPP, "3$^{rd}$ Generation Partnership Project; Technical Specification Group Radio Access Network; Medium Access Control (MAC) Protocol Specification (Release 5)," 3GPP TS 25.321 V5.10.0, (Dec. 2004).
3GPP, "3$^{rd}$ Generation Partnership Project; Technical Specification Group Radio Access Network; Medium Access Control (MAC) Protocol Specification (Release 6)," 3GPP TS 25.321 V6.2.0, (Jun. 2004).
3GPP, "3$^{rd}$ Generation Partnership Project; Technical Specification Group Radio Access Network; Medium Access Control (MAC) Protocol Specification (Release 6)," 3GPP TS 25.321 V6.4.0, (Mar. 2005).
3GPP, "3$^{rd}$ Generation Partnership Project; Technical Specification Group Radio Access Network; UTRAN Overall Description (Release 1999)," 3GPP TS 25.401 V3.10.0, (Jun. 2002).
3GPP, "3$^{rd}$ Generation Partnership Project; Technical Specification Group Radio Access Network; UTRAN overall description (Release 4)," 3GPP TS 25.401 V4.6.0, (Dec. 2002).
3GPP, "3$^{rd}$ Generation Partnership Project; Technical Specification Group Radio Access Network; UTRAN overall description (Release 5)," 3GPP TS 25.401 V5.8.0, (Jun. 2004).

(56) References Cited

OTHER PUBLICATIONS

3GPP, "3$^{rd}$ Generation Partnership Project; Technical Specification Group Radio Access Network; UTRAN overall description (Release 5)," 3GPP TS 25.401 V5.9.0, (Sep. 2004).
3GPP, "3$^{rd}$ Generation Partnership Project; Technical Specification Group Radio Access Network; UTRAN overall description (Release 6)," 3GPP TS 25.401 V6.3.0, (Jun. 2004).
3GPP, "3$^{rd}$ Generation Partnership Project; Technical Specification Group Radio Access Network; UTRAN overall description (Release 6)," 3GPP TS 25.401 V6.5.0, (Dec. 2004).
3GPP, "3rd Generation Partnership Project; Technical Specification Group Radio Access Network; Requirements for support of radio resource management (FDD) (Release 1999)," 3GPP TS 25.133 V3.18.0 (Jun. 2004).
3GPP, "3rd Generation Partnership Project; Technical Specification Group Radio Access Network; Requirements for support of radio resource management (FDD) (Release 1999)," 3GPP TS 25.133 V3.20.0 (Mar. 2005).
3GPP, "3rd Generation Partnership Project; Technical Specification Group Radio Access Network; Requirements for support of radio resource management (FDD) (Release 4)," 3GPP TS 25.133 V4.12.0 (Mar. 2004).
3GPP, "3rd Generation Partnership Project; Technical Specification Group Radio Access Network; Requirements for support of radio resource management (FDD) (Release 4)," 3GPP TS 25.133 V4.14.0 (Mar. 2005).
3GPP, "3rd Generation Partnership Project; Technical Specification Group Radio Access Network; Requirements for support of radio resource management (FDD) (Release 5)," 3GPP TS 25.133 V5.11.0 (Jun. 2004).
3GPP, "3rd Generation Partnership Project; Technical Specification Group Radio Access Network; Requirements for support of radio resource management (FDD) (Release 5)," 3GPP TS 25.133 V5.14.0 (Mar. 2005).
3GPP, "3rd Generation Partnership Project; Technical Specification Group Radio Access Network; Requirements for support of radio resource management (FDD) (Release 6)," 3GPP TS 25.133 V6.6.0 (Jun. 2004).
3GPP, "3rd Generation Partnership Project; Technical Specification Group Radio Access Network; Requirements for support of radio resource management (FDD) (Release 6)," 3GPP TS 25.133 V6.9.0 (Mar. 2005).
3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.
3GPP2 C.S0003-C, "Medium Access Control (MAC) Standard for cdma2000 Spread Spectrum Systems", 3$^{rd}$ Generation Partnership Project 2 "3GPP2", Version 2.0., Release C, Aug. 2004.
3GPP2 C.S0004-C, "Signaling Link Access Control (LAC) Standard for cdma2000 Spread Spectrum Systems", 3$^{rd}$ Generation Partnership Project 2 "3GPP2", Version 2 0. Revision C, Jul. 23, 2004.
3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision C, Jul. 23, 2004.
Ericsson, "E-DCH multiplexing and transport channel structure," TSG-RAN Working Group 2 meeting #42, Tdoc R2-040917 (May 10-14, 2004).
Interdigital, "Text Proposal on Enhanced Uplink MAC Architecture for TS 25.309," 3GPP TSG RAN WG2 R6 AdHoc, R2-041276 (Jun. 21-24, 2004).
Third Office Action dated Mar. 3, 2015 (+English translation), in Chinese Patent Application No. 201110371173.0, 11 pages.
Examiner's Report dated Jun. 3, 2015, in Canadian Patent Application No. 2,855,844, 3 pages.
Official Action dated Jun. 23, 2015 (+English translation), in Norwegian Patent Application No. 20070935, 3 pages.
"3rd Generation Partnership Project; Technical Specification Group Radio Access Network; Feasibility Study for Enhanced Uplink for UTRA FDD; (Release 6)", 3GPP Draft; R1-031164_TR25.896_1.0.2, France, vol. RAN WG1, No. Lisbon, Portugal; Oct. 31, 2003, XP050098227.
Communication pursuant to Article 94(3) EPC dated Sep. 1, 2015, in European Patent Application No. 10179333.9, 4 pages.
Extended European Search Report dated Oct. 19, 2015, in European Patent Application No. 15180482.0, 8 pages.
Norwegian Office Action mailed on Feb. 24, 2016, Norwegian Patent Application No. 20151760, 3 pages.
Norwegian Search Report mailed on Feb. 24, 2016, Norwegian Patent Application No. 20151760, 2 pages.
Notice to Grant mailed on Mar. 10, 2016, Norwegian Patent Application No. 20070935, 2 pages.
Technical Specification Group Radio Access Network: "Feasibility Study for Enhanced Upling for UTRA FDD", 3GPP TR 25.896, V6.0.0, Release 6. Mar. 2004, side 1-169.

* cited by examiner

METHOD AND APPARATUS FOR ENHANCED UPLINK MULTIPLEXING

CROSS REFERENCE TO RELATED APPLICATIONS

This application is a continuation of U.S. patent application Ser. No. 14/032,114 filed Sep. 19, 2013, which is a continuation of U.S. patent application Ser. No. 13/021,884 filed Feb. 7, 2011, now issued as U.S. Pat. No. 8,619,645, which is a continuation of U.S. patent application Ser. No. 11/113,763 filed on Apr. 25, 2005, now issued as U.S. Pat. No. 7,885,245, which claims the benefit of U.S. Provisional Application No. 60/588,960 filed Jul. 19, 2004, all of which are incorporated by reference as if fully set forth.

FIELD OF INVENTION

The present invention is related to a wireless communication system. More particularly, the present invention is a method and apparatus for enhanced uplink multiplexing.

BACKGROUND

In third generation (3G) wireless communication systems, a wireless transmit/receive unit (WTRU) has the ability to support multiple applications with different quality of services (QoS) requirements running simultaneously. Applications associated with individual data flows from a radio link control layer (RLC) are known as logical channels. These logical channels are mapped to transport channels (TrCH) within the medium access control (MAC) layer. Each TrCH is associated with a specific QoS. Logical channels with similar QoS requirements are mapped to common TrCHs.

Several TrCHs can be multiplexed into a coded composite transport channel (CCTrCH). Each TrCH has a specified coding rate and rate matching attributes within the CCTrCH to allow for different levels of error protection. Combination of TrCHs that are allowed in a CCTrCH transmit time interval (TTI) are defined by a transport format combination set (TFCS). The TFCS defines the allowed multiplexing combinations of TrCHs within each CCTrCH TTI.

Each TTI, the MAC selects a transport format combination (TFC) from the TFCS or a configured TFC subset. TFCs are selected based on the transmission priority of the logical channels that are mapped to each TrCH. TFC selection rules are based on maximizing transmission of the highest priority data.

The TFCS is configured to allow certain TrCH data combinations and not allow others. This mechanism is used to ensure maximum and minimum data rates of each TrCH within the CCTrCH.

Each TTI, TFCs within the TFCS are checked to determine if the TFCs can be supported by the available transmission power of the WTRU. A TFC which can not be supported is considered to be in an excess power state and can be transmitted for a short period. If the transmission power requirement is not satisfied within this period the TFC is blocked from transmission. Certain TFCs in a "minimum set" are excluded from being blocked. These transport channel configurations for the TFCS, TFC selection rules and the minimum set are used to maintain QoS of individual data flows.

Enhanced uplink (EU) has been developed to reduce transmission latency and increase radio resource efficiency in the uplink. A WTRU is provided with only one EU TrCH. Since there is only one EU TrCH per WTRU, just a list of transport formats (TFs) for the EU TrCH exists that does not distinguish requirements for different logical channel priorities and QoS. The configured CCTrCH TFCS and TFC selection rules to properly coordinate transmission multiplexing within TTIs only work where multiple TrCHs are provided and logical channels of common QoS requirements are mapped to specific TrCHs. Since there is only one EU TrCH, these multiplexing rules and the QoS provided for individual data flows are not available for EU.

In order to properly maintain QoS requirements of individual data flows, it is necessary to define new WTRU multiplexing rules for logical channels or MAC-d flows mapped onto enhanced uplink medium access control (MAC-e) protocol data units (PDUs).

SUMMARY

The present invention is a method and apparatus for enhanced uplink multiplexing. A set of combination of MAC-d flows (an/or logical channels), that are allowed to be multiplexed within a MAC-e PDU is defined for each WTRU. The WTRU MAC-e entity selected a combination among a set of allowed combinations for multiplexing MAC-d flows for each MAC-e PDU. Certain logical channel or corresponding MAC-d flow combinations may be defined that can not be blocked from transmission even when the WTRU is in a transmit power restricted state. The amount of data from each logical channel or corresponding MAC-d flow than can be multiplexed within a MAC-e PDU may be defined to ensure guaranteed data rates. When the WTRU is in a restricted power condition that reduces the EU transmission payload below what is allowed by the EU channel allocation received from Node-B, an indication of the restricted power condition may be passed to Node-B with the EU transmission.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

Figure 1:
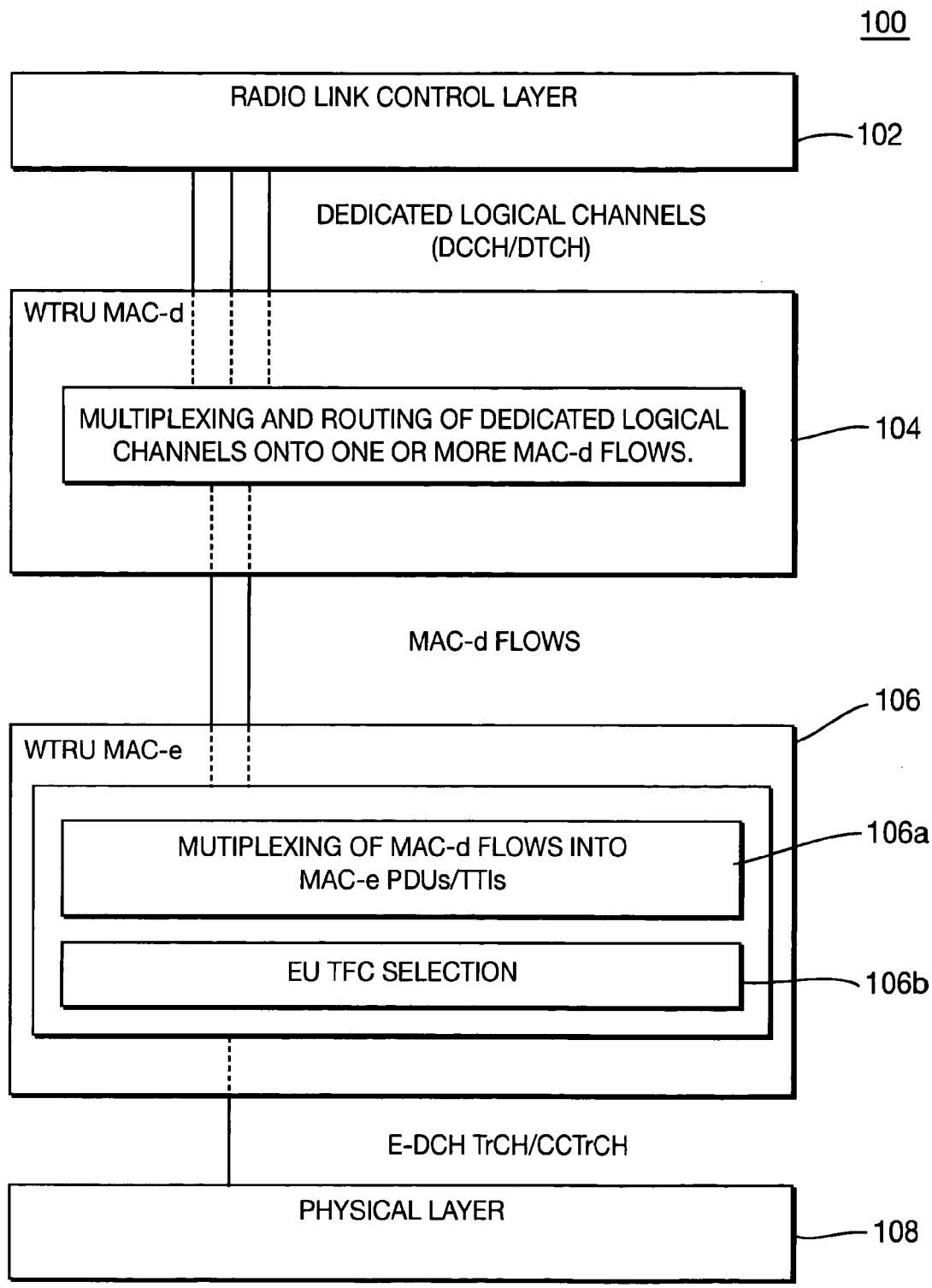
FIG. 1 is a block diagram of a WTRU for EU multiplexing in accordance with the present invention.

FIG. 1 is a block diagram of a WTRU 100 for EU multiplexing in accordance with the present invention. The WTRU comprises an RLC layer 102, a MAC-d entity 104, a MAC-e entity 106 and a PHY entity 108. The RLC layer 102, the MAC-d entity 104 and the PHY entity 108 perform similar functions of a WTRU in a current wireless communication system. It should be noted that the configuration shown in FIG. 1 is provided as an example, and the functions performed by the MAC-d entity and the MAC-e entity may be incorporated in one entity, and the functions of the entities in FIG. 1 may be implemented in more or less functional entities.

The RLC layer 102 comprises one or more RLC entities, each associated with certain logical channels, such as a dedicated control channel (DCCH) or a dedicated traffic channel (DTCH). Each MAC-d flow has its associated QoS attributes. The MAC-e entity 106 comprises a multiplexing function 106a and an EU TFC selection function 106b. The MAC-e entity multiplexes the MAC-d flows onto MAC-e PDUs while selecting a proper TF for the enhanced uplink dedicated channel (E-DCH). The PHY entity 108 processes MAC-e PDUs for wireless transmission.

The WTRU 100 is configured to support EU transmission through a single EU TrCH. In accordance with the present invention, a set of allowed combinations of MAC-d flows, (and/or logical channels), that are allowed to be multiplexed within a MAC-e PDU is defined for each WTRU 100. MAC-e PDU multiplexing rules are defined which specify what data may be chosen from MAC-d flows, (and/or logical channels), and multiplexed onto a MAC-e PDU for maintaining QoS requirements. The rules may be pre-specified by the standard or may be signaled to the WTRU 100 by a radio network controller (RNC) through radio resource control (RRC) procedures. An RRC signaled set of combinations provides the ability for the RNC to control logical channels or corresponding MAC-d flows to achieve their specific QoS requirements.

Certain MAC-d flow, (and/or logical channels), combinations that can not be blocked from transmission even when the WTRU is in a transmit power restricted state may also be defined to avoid blocking of any one MAC-d flow, (and/or logical channels). Transmission of these combinations may also be allowed without requiring EU channel allocations from Node-B.

In accordance with one embodiment, the number of PDUs per transmit time interval (TTI) from each MAC-d flow, (and/or logical channels), that can be multiplexed within a MAC-e PDU may be configured. The number of PDUs per TTI represents a data rate for each channel. For example, all allowed combinations may include one or more PDUs from a particular logical channel, which would guarantee that this particular logical channel is always served.

In accordance with another embodiment, the set of combinations can be defined with specific data rate from each MAC-d flow, (and/or logical channels), that can be multiplexed onto the MAC-e PDUs. The set of combinations may also be defined with specified data rate that can be combined or not, with specified data rates from other MAC-d flows, (and/or logical channels). The data rates from each MAC-d flow, (and/or logical channels), may be explicitly matched with the data rate of other MAC-d flows, (and/or logical channels). In certain combinations, the other channel(s) may transmit no data. The combination may also just identify possible rates for each MAC-d flow, (and/or logical channels), and allow the WTRU to choose any know rate from other channels that does not exceed the allocated physical channel or transmission power limits.

Within the set of allowed combinations, absolute or relative priority multiplexing rules may be defined to maintain proper prioritization between MAC-d flows, (and/or logical channels). In accordance with an absolute priority scheme, a logical channel or MAC-d flow of higher priority is always served before a logical channel or MAC-d flow of lower priority is served. The chosen multiplexing combination is the one that supports the most highest priority data within the set of TFs defined for the EU TrCH.

Alternatively, logical channel or MAC-d flow combinations configured by RRC signaling procedures may take precedence over the absolute priority. The RRC signaling procedures may configure allowed combinations of logical channels or MAC-d flows within a MAC-e PDU. The core network may also specify the data size or number of MAC-d PDUs that are allowed to be multiplexed from each logical channel or MAC-d flow into each MAC-e PDU.

In accordance with a relative priority scheme, a weighting mechanism is specified in order to properly serve low priority channels. A weight is defined for each MAC-d flow, (and/or logical channel). Available bandwidth on the E-DCH is distributed to each logical channel or MAC-d flow according to the defined weight. This approach allows data rates to be distributed across logical channels or corresponding MAC-d flows and avoids bandwidth starvation of lower priority channels.

The set of allowed combinations may by explicitly signaled by RRC procedures. The RRC configuration allows the RNC to control WTRU multiplexing choices, which can be unique to requirements of the radio access bearer (RAB). Specific allowed combinations of logical channels or MAC-d flows are configured for multiplexing within each MAC-e PDU.

The WTRU continuously monitors the state of the allowed combinations of MAC-d flows, (and/or logical channels), each EU TTI and selects a proper combination for transmission in accordance with the monitored state. If a transmit power requirement for a particular combination exceeds a remaining transmit power allowed for the WTRU E-DCH transmission, the combination is in an excess power state and the combination is blocked from E-TFC selection. The time to detect and block transmission of the MAC-d flow, (and/or logical channel), combinations may take several E-DCH TTIs. A similar mechanism is used to restore combinations to the set of allowed combinations when transmit power is sufficient.

Certain MAC-d flow, (and/or logical channel), combinations that can not be blocked from transmission even when the WTRU is in a transmit power restricted state may also be defined to avoid blocking of any one MAC-d flow, (and/or logical channel). Transmission of these combinations may also be allowed without requiring EU channel allocations from Node-B. Since there is only one EU TrCH, a set of TFCs corresponding to multiple TrCHs is not defined, but just a list of TFs is defined for the single EU TrCH. Therefore it is necessary to define MAC-d flow, (and/or logical channel), combinations in a minimum set which is excluded from being blocked. For example, the E-DCH minimum set may be defined such that it is always possible to transmit at least one MAC-d PDU from any MAC-d flow or logical channel even when the remaining power available for the E-DCH is restricted.

The rules for multiplexing MAC-d flows, (and/or logical channels), onto MAC-e PDUs per TTI may include a combination for each MAC-d flow, (and/or logical channel), that includes the smallest possible payload for one logical channel or MAC-d flow and no data for all other logical channels or MAC-d flows mapped to the EU TrCH. The set of these combinations may be defined as the minimum set. This may be a signaling radio bearer for guaranteeing a signaling to the Node-B in a power restricted state.

Under current 3GPP standards, a TFC is configured for each TrCH that provides the smallest possible transmission on one TrCH and no data on other TrCHs within the CCTrCH. These TFCs are always allowed for transmission to avoid the possibility of blocking individual channels. In the case of EU with only one TrCH supporting multiple logical channels or MAC-d flows, a single reserved TFC is not enough. For EU TrCH, several EU TFs or TFCs are required to support the minimum set on multiplexing combinations. EU TF or TFC includes configurations that allow for transmission of the smallest possible payload for one logical channel or MAC-d flow.

When the WTRU is in a restricted power condition that reduces the EU transmission payload below what is allowed by the EU channel allocation received from a Node-B, an indication of the restricted power condition is passed to the Node-B with the EU transmission. The indication may be explicitly signaled by a signaling message, (such as a new information element). The WTRU may inform the level of available transmit power of the WTRU.

The Node-B may implicitly determine that the WTRU is in a power restricted state. The Node-B may detect the WTRU power restricted condition by comparing the channel allocation signaled to the WTRU and the corresponding transmission received from the WTRU. If the channel allocation exceeds what is transmitted and the WTRU either continues to transmit at the reduced rate or indicates it has more data to send, the Node-B implicitly detects the WTRU power restricted condition and takes appropriate actions.

Figure 2:
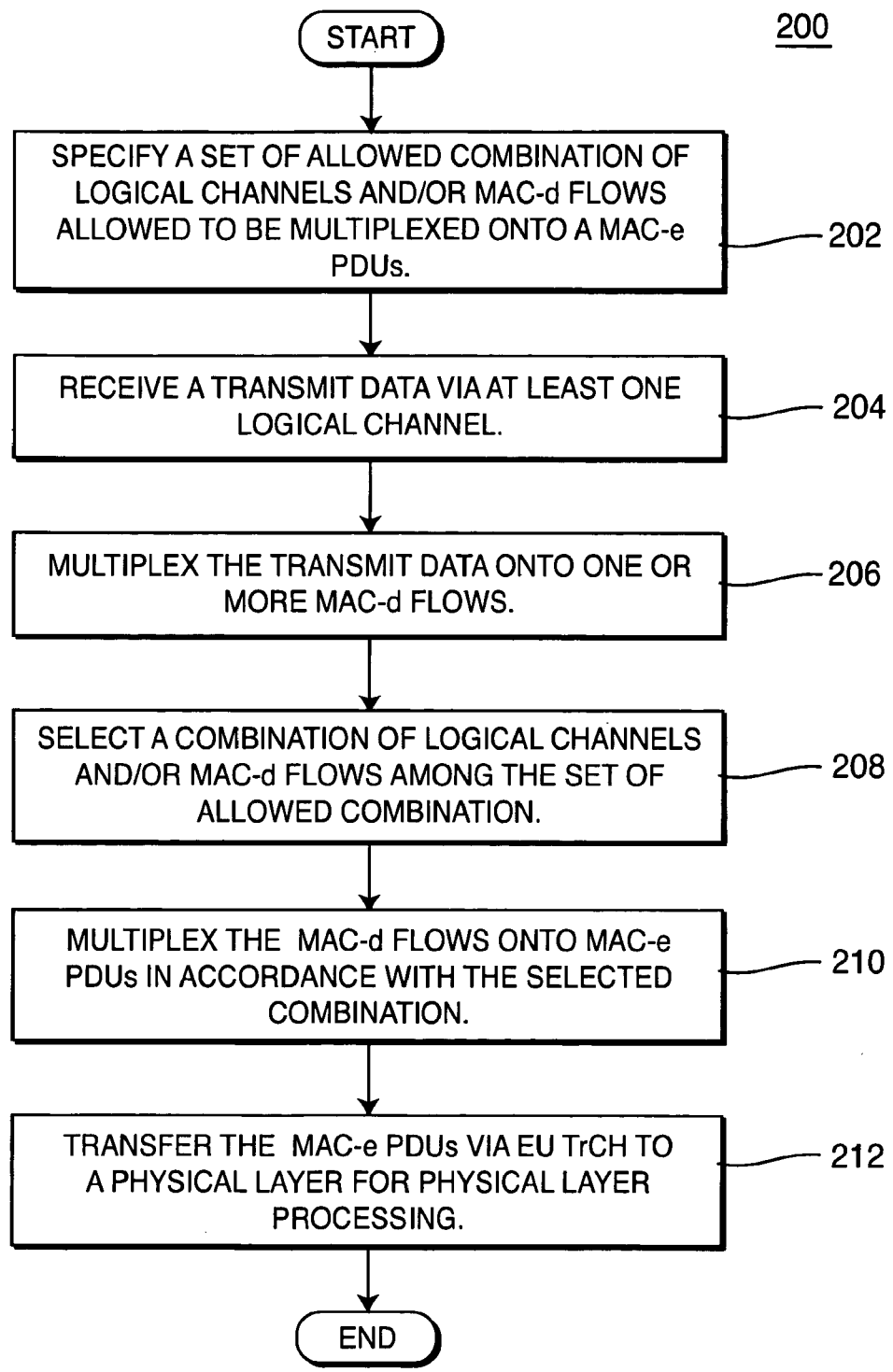
FIG. 2 is a flow diagram of a process for EU multiplexing in accordance with the present invention.

FIG. 2 is a flow diagram of a process 200 for EU multiplexing in accordance with the present invention. A WTRU is configured to support EU transmission through a single EU TrCH. A set of allowed combinations of MAC-d flows, (and/or logical channels), which is allowed to be multiplexed onto one MAC-e PDU is defined for each WTRU (step 202). Transmit data is processed at an RLC layer by at least one RLC entity and forwarded to a MAC-d entity via at least one logical channel (step 204). The transmit data is mapped onto one or more MAC-d flows at an MAC-d entity (step 206). Each MAC-d flow is associated with unique QoS attributes. A combination of MAC-d flows, (and/or logical channels), among the set of allowed combination is selected (step 208). Data from the MAC-d flows are multiplexed onto MAC-e PDUs in accordance with the selected combination (step 210). The MAC-e PDUs are forwarded via an EU TrCH to a physical layer for physical layer processing (step 212).

Figure 3:
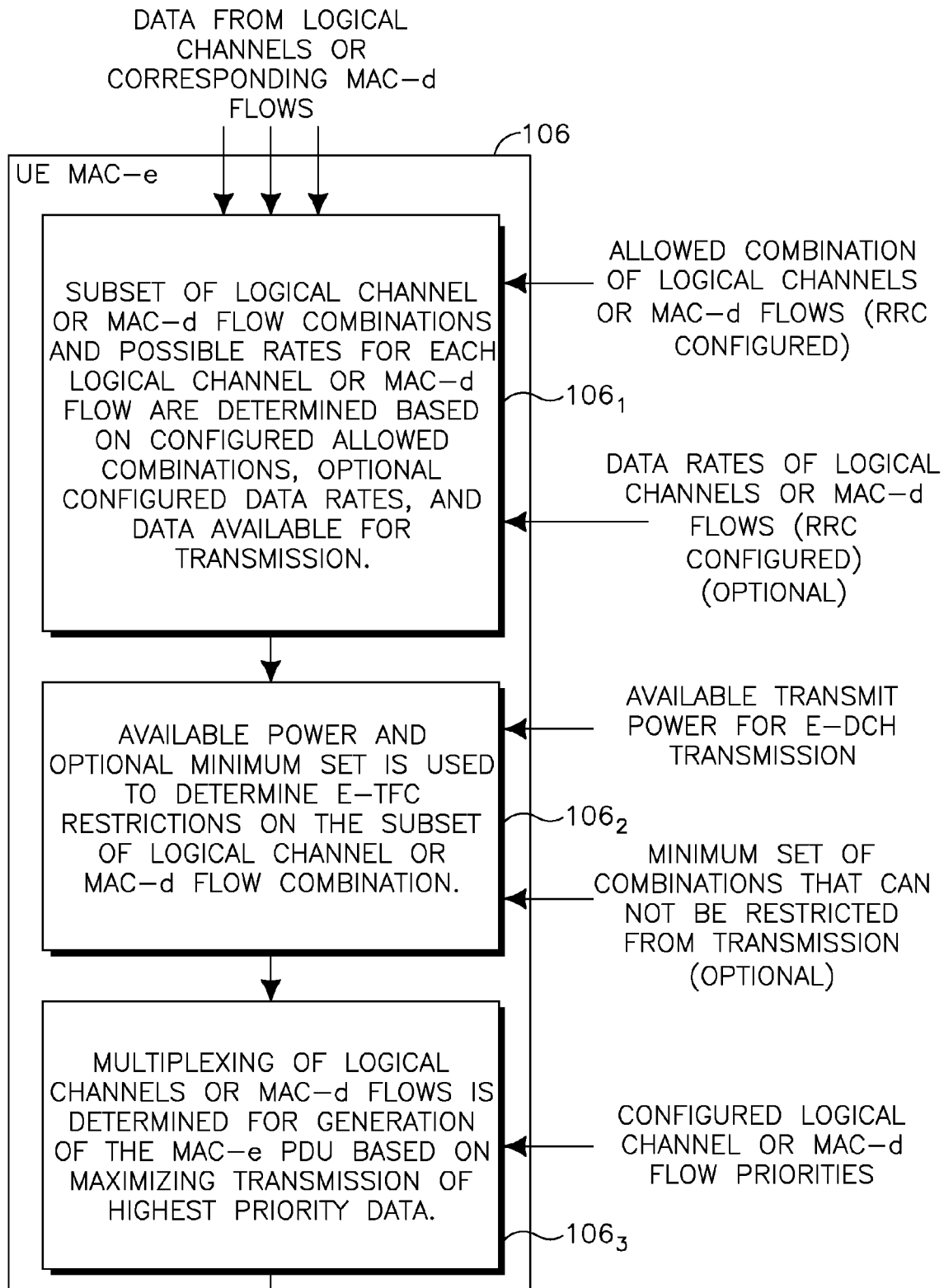
FIG. 3 is a block diagram of an example of WTRU MAC-e entity including functional blocks along with controlling signals in accordance with the present invention.

FIG. 3 is a block diagram of an example of WTRU MAC-e entity 106 including functional blocks along with controlling signals in accordance with the present invention. FIG. 3 shows three functional blocks. However, the configuration shown in FIG. 3 is provided as an example, and it should be noted that any other configuration may be implemented without departing from the teachings of the present invention. The functional blocks may be combined or separated more or less functional blocks, the order of the functional blocks may be changed in different order, and the functions may be performed simultaneously or in sequence.

Data from logical channels or corresponding MAC-d flows enter the first functional block $106_1$ of the MAC-e entity 106. The first functional block $106_1$ determines a subset of MAC-d flow, (and/or logical channels), combinations among the allowed combinations of MAC-d flows, (and/or logical channel). Optionally, the first functional block $106_1$ may determine possible rates for each MAC-d flow, (and/or logical channel), in accordance with the RRC configuration.

The second functional block $106_2$ determines available power and E-TFCs for the subset of MAC-d flow, (and/or logical channel), combinations. The available power for E-DCH is also a configurable parameter. Optionally, the second functional block $106_2$ may determine the E-TFC based on a minimum set of combinations which cannot be blocked from transmission.

The third functional block $106_3$ generates MAC-e PDUs multiplexing MAC-d flows in accordance with a predetermined criteria, such as configured logical channel or MAC-d flow priorities maximizing transmission of the highest priority data.

Although the features and elements of the present invention are described in the preferred embodiments in particular combinations, each feature or element can be used alone without the other features and elements of the preferred embodiments or in various combinations with or without other features and elements of the present invention.

The invention claimed is:

1. A method comprising:
    receiving data over a plurality of logical channels with a receiving element, each logical channel being associated with a Quality of Service (QoS) requirement;
    establishing an allowed data rate for each of the plurality of logical channels for the multiplexing of data:
    multiplexing data from the plurality of logical channels into an enhanced medium access control (MAC-e) protocol data unit (PDU) based on a priority associated with each of the plurality of the logical channels, wherein the multiplexing is to maintain the QoS requirements of the logical channels; and
    transmitting the MAC-e PDU over an uplink transport channel with a transmitting element.

2. The method of claim 1, wherein the data from the plurality of logical channels is multiplexed based on both the allowed data rate and the priority associated with each of the plurality of logical channels.

3. The method of claim 1, wherein the data from the plurality of logical channels is multiplexed utilizing absolute priority of the logical channels, data from a logical channel associated with a highest priority being multiplexed first up to the allowed data rate associated with the highest priority logical channel before data from other logical channels is multiplexed.

4. The method of claim 1, wherein the data from the plurality of logical channels is multiplexed utilizing absolute priority of the logical channels, data from a logical channel associated with a higher priority being multiplexed up to its allowed data rate before data from a logical channel associated with a lower priority is multiplexed.

5. The method of claim 1, wherein the allowed data rate is received from a radio network.

6. A wireless transmit/receive unit (WTRU) comprising:
    a receiver to receive data over a plurality of logical channels, each logical channel being associated with a Quality of Service (QoS) requirement;
    a multiplexor to multiplex data from the plurality of logical channels into an enhanced medium access control (MAC-e) protocol data unit (PDU) based on a priority associated with each of the plurality of the logical channels, wherein an allowed data rate is established for each of the plurality of logical channels for the multiplexing of data, and wherein the multiplexing is to maintain the QoS requirements of the logical channels; and
    a transmitter to transmit the MAC-e PDU over an uplink transport channel.

7. The WTRU of claim 6, wherein the multiplexer is to multiplex the data from the plurality of logical channels based on both the allowed data rate and the priority associated with each of the plurality of logical channels.

8. The WTRU of claim 6, wherein the data from the plurality of logical channels is multiplexed utilizing absolute priority of the logical channels, the multiplexer to multiplex data from a logical channel associated with a highest priority first up to the allowed data rate associated with the highest priority logical channel before data from other logical channels is multiplexed.

9. The WTRU of claim 6, wherein the data from the plurality of logical channels is multiplexed utilizing absolute priority of the logical channels, the multiplexer to multiplex data from a logical channel associated with a higher priority up to its allowed data rate before data from a logical channel associated with a lower priority is multiplexed.

10. The WTRU of claim 6, wherein the allowed data rate is to be received from a radio network.

11. A method for multiplexing data comprising:
receiving configuration information from a wireless network by a receiver, wherein the configuration information indicates a priority of each logical channel of a plurality of logical channels, each logical channel being associated with a Quality of Service (QoS) requirement;
determining a data size based on the configuration information;
multiplexing data of the logical channels into an enhanced medium access control (MAC-e) protocol data unit (PDU) based on the priority and the determined data size, wherein the multiplexing is to maintain the QoS requirements of the logical channels, wherein multiplexing data of the logical channels includes multiplexing data from a highest priority logical channel to a lowest priority logical channel; and
transmitting the MAC-e PDU to the wireless network by a transmitter.

12. The method of claim 11, wherein the data from the plurality of logical channels is multiplexed utilizing absolute priority of the logical channels, multiplexing data of the logical channels including multiplexing data of a highest priority logical channel based on the determined data size prior to multiplexing a next highest priority logical channel.

13. A wireless transmit/receive unit (WTRU) comprising:
means for receiving configuration information from a wireless network, wherein the configuration information indicates a priority of each logical channel of a plurality of logical channels, each logical channel being associated with a Quality of Service (QoS) requirement;
means for determining a data size based on the configuration information;
means for multiplexing data of the logical channels into an enhanced medium access control (MAC-e) protocol data unit (PDU) based on the priority and the determined data size, wherein the multiplexing is to maintain the QoS requirements of the logical channels, wherein the means for multiplexing data is to multiplex the data of the logical channels from a highest priority logical channel to a lowest priority logical channel; and
means for transmitting the MAC-e PDU to the wireless network.

14. The WTRU of claim 13, wherein the data from the plurality of logical channels is multiplexed utilizing absolute priority of the logical channels, the means for multiplexing data to multiplex the data of a highest priority logical channel based on the determined data size prior to multiplexing a next highest priority logical channel.

15. A method comprising:
receiving data over a plurality of logical channels with a receiving element, each logical channel being associated with a Quality of Service (QoS) requirement;
multiplexing data from the plurality of logical channels into an enhanced medium access control (MAC-e) protocol data unit (PDU) based on a priority associated with each of the plurality of the logical channels, wherein the multiplexing is to maintain the QoS requirements of the logical channels; and
transmitting the MAC-e PDU over an uplink transport channel with a transmitting element;
wherein the data from the plurality of logical channels is multiplexed based on relative priority of the logical channels, including a weight being defined for each logical channel and the multiplexing being performed according to the defined weights of the logical channels.

16. A wireless transmit/receive unit (WTRU) comprising:
a receiver to receive data over a plurality of logical channels, each logical channel being associated with a Quality of Service (QoS) requirement;
a multiplexor to multiplex data from the plurality of logical channels into an enhanced medium access control (MAC-e) protocol data unit (PDU) based on a priority associated with each of the plurality of the logical channels, wherein the multiplexing is to maintain the QoS requirements of the logical channels; and
a transmitter to transmit the MAC-e PDU over an uplink transport channel;
wherein the multiplexer is to multiplex the data from the plurality of logical channels based on relative priority of the logical channels, wherein a weight is defined for each logical channel and the multiplexing is performed according to the defined weights of the logical channels.

* * * * *